May 29, 1956      W. E. BAIER      2,748,005
METHOD OF CANNING FOODS
Filed Aug. 4, 1952
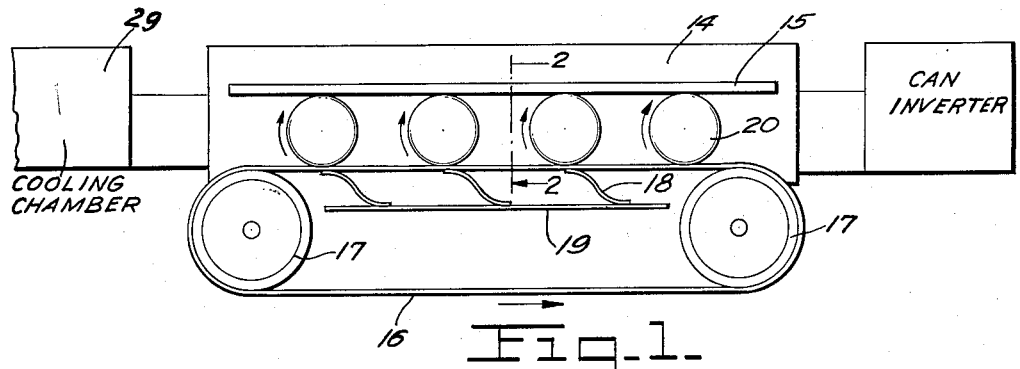
Fig. 1.
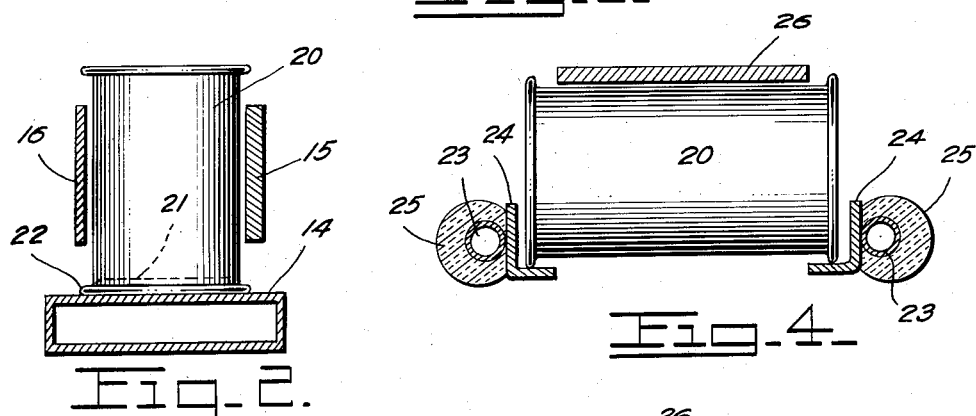
Fig. 2.
Fig. 4.
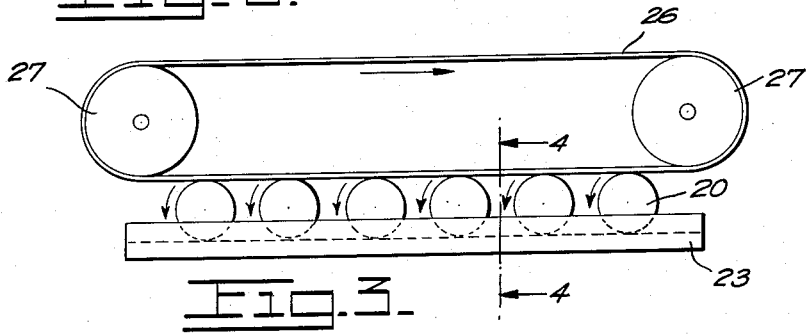
Fig. 3.
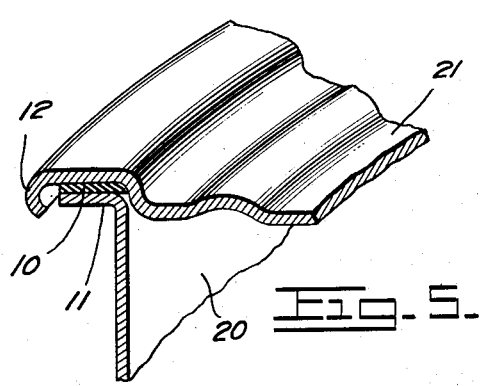
Fig. 5.
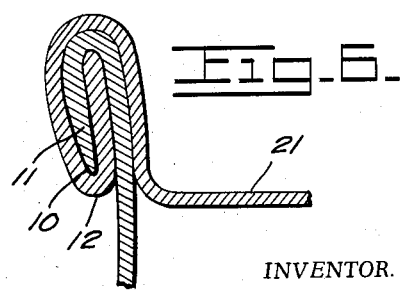
Fig. 6.
INVENTOR.
WILLARD E. BAIER
BY Michael J. McDonald
AGENT.

United States Patent Office 2,748,005
Patented May 29, 1956

2,748,005

METHOD OF CANNING FOODS

Willard E. Baier, Ontario, Calif., assignor to Sunkist Growers, Inc., Los Angeles, Calif., a corporation of California Application August 4, 1952, Serial No. 302,539

13 Claims. (Cl. 99—182)

This invention relates to a method of canning liquid foods, as well as other foods which are packed in syrup or other liquid medium.

More particularly, the invention relates to a method of canning concentrated or natural strength citrus juices.

One object of the invention is to provide a method of sterilizing sanitary type cans containing liquid foods, as well as food packed in syrup or other liquid medium, wherein the length of time the contents of the can must be held at an elevated temperature is reduced to a minimum.

Another object of the invention is to provide a method of sterilizing sanitary type cans containing liquid food, as well as foods packed in syrup or other liquid medium, wherein the seam portions of the can are sterilizing without relying on high food temperatures thus providing a satisfactory sterile pack at lower food temperatures than have been required heretofore.

A further object is to provide a method whereby the double seam between the lid and the can is rendered sterile without relying on the maintenance of elevated food temperatures or relatively prolonged holding periods at such temperatures.

A further object is to provide canned citrus juices of improved food value and flavor.

Other objects and advantages will be apparent on reference to the following descriptions and accompanying drawings in which:

Figure 1 is a diagrammatic plan view of one form of seam sterilizer;

Figure 2 is a section taken on line 2—2 of Figure 1;

Figure 3 is a diagrammatic elevation of another form of mechanism for performing my process;

Figure 4 is a section of the mechanism of Figure 3 taken on line 4—4 of Figure 3;

Figure 5 is a perspective view partly in section showing the relationship of the can and cover before seaming;

Figure 6 is a cross section showing details of a double seam.

According to present day practices, the can manufacturer supplies the canner with sanitary type cans having a bottom double seamed to one end thereof, the other end being open for filling. The lid is supplied separately to the canner. After the can is filled with food, it is conveyed to an automatic seaming machine which double seams the lid to the can body, whereby an air tight container is obtained.

In one convention method of canning citrus juices, the juice is first pasteurized by heating to a temperature and for a time sufficient to destroy those microorganisms which would result in the spoilage of the juices. The can is then filled, or substantially filled, with the hot juice and the lid double seamed to the can body. It is then necessary to hold the can and its contents for a sufficient length of time to allow the can to be heated by the contents to a temperature sufficienly high to destroy microorganisms on the inner surfaces of the can and in the seams. The can is often rolled on its side or inverted to insure contact of the juice with all interior portions thereof.

As best shown in Figure 5, those portions of the underside of the lid of a sanitary type can 20 which come in contact with the can body carry a coating of sealing or gasket compound 10 which usually contains rubber. In the seaming operation the curl 12 on the lid and the flange 11 on the can are rolled together to form a double seam, as best shown in Figure 6. The gasket compound on the lid supplies the material between the layers of metal necessary to insure a permanent air-tight seal.

In practice the juice is heated to a temperature high enough to provide the necessary degree of sterility. This temperature depends on the nature of the food being canned and its subsequent treatment. Highly acid foods such as lemon juice, for example, would be adequately sterilized at a lower temperature than would be required for less acid food such as orange juice. Foods that are to be stored at low temperatures would likewise require a lower temperature for prevention of spoilage than would be required for products to be distributed and stored at room temperature. The temperature and holding time employed is generally determined by the temperatures and times required to sterilize the can, often making it necessary to heat the product to higher temperatures and for longer periods than would be required for adequate sterilization of the product itself. If it were not necessary to rely on the hot food for can sterilizaion the food could be cooled immediately after sterilization and before canning, resulting in much less flavor deterioration, than is now obtained. As a general rule it has been found necessary to maintain the contents of the can, after seaming, at an elevated temperature in order that the heat shall penetrate the folds of the seam. The heat conductivity of the gasket compound is much lower than that of the metal container and acts as a heat insulator slowing down the passage of heat to all parts of the double seams. Sterilization of the double seam accordingly requires a maintenance of a higher food temperature for a longer period of time than is necessary to sterilize either the food itself or the inner surfaces of the can. It will thus be seen that the minimum time-temperature combination is determined by the heat requirements for a sterile seam. This is objectionable for the reason that the loss of flavor and vitamins, particularly in citrus juices, is a function of both time and temperature. In other words the longer the juice is maintained at a high temperature the greater the loss of food values and flavor.

According to my invention, after the canned hot juice has been sealed, the double seamed portion at the lid end of the can is placed in contact with a heated surface whereby the temperature of the seam is quickly increased without any appreciable increase in the temperature of the contents of the can. In order to assure sterility of those portions of the interior of the can contacted by the juice I prefer to invert the can or otherwise manipulate it so that these portions will be contacted and heated to a temperature approaching that of the contents. This may be accomplished by inverting the can or by rolling it on its side before, during, or after seam heating. After the seam portion has been applied to the heated surface for a length of time sufficient to increase the seam temperature to a point where adequate sterility is obtained, the can and its contents are immediately cooled. By following my procedure a substantially shorter holding time and lower juice temperatures are required than are necessary when following the conventional canning procedure.

I have found that seam temperatures may be obtained very easily which are at least 50° F. higher than the juice temperature in approximately ten seconds. A temperature rise of from 30 to 40° F. may be expected in the lid seam of a filled No. 2 can be contact with a heated surface or hot plate at 320 to 420° F. for ten seconds. This rise in temperature may be increased to about 90° F. by the use of a hot plate temperature of about 700° F. When the higher temperatures are used, shorter periods of contact are required. The time-temperature relationship selected should be such that the seam will not reach a temperature high enough to melt the solder incorporated in the can structure or injure the sealing compound. This seam sterilizing treatment has no appreciable effect on the juice temperature.

The length of time that the seam need be kept in contact with the hot plate will depend upon the temperature of the plate. The higher the temperature of the hot plate, the shorter the time required to maintain the seam in contact therewith. In other words there is, within limits, a time-temperature relationship that must be observed for adequate seam sterilization. The desired relationship is obtained by selecting a hot plate temperature, a hot plate length, and a conveyor belt speed that will provide a rapid increase in the seam temperature to a point where adequate sterilization of the seam is obtained. I have found that a practical lower limit for the temperature of the surface of the hot plate is about 250° F.

My novel process may be carried out with various types of apparatus. One form of seal sterilizer is shown in Figure 1, in which the can, immediately after filling with hot juice and sealing, is passed through a conventional can inverter 13, which turns the sealed cans through an angle of 180° and guides them to a hot plate 14. Due to the construction of the sanitary type cans, only the lid seam will contact the surface of the hot plate since the lid is recessed as best shown at 21 in Figures 2, 5 and 6. The inverted cans are passed along the hot plate between a guide rail 15 and one run of endless conveyor belt 16 which is supported on pulleys 17. The belt 16 is maintained in close contact with the cans by means of springs 18 which are mounted on a rigid plate 19 between the runs of the belt. The belt is driven by suitable power means, not shown, connected to one of the pulleys 17. It will be noted that by means of this arrangement the cans rotate as they slide along the hot plate. This sliding, rotating contact tends to keep the plate clean and prevents the accumulation of burned food or juices that would otherwise accumulate due to spillage and interfere with the transfer of heat to the cans. Since the time of contact with the hot plate is but a matter of seconds, there will be no perceptible increase in the juice temperature. After a can has traversed the length of the surface of the hot plate 14 it is conveyed directly into a cooling chamber 19 where it is immediately cooled.

Another type of apparatus whereby heat may be applied specifically to the double seam is illustrated in Figures 3 and 4. The can, immediately after filling with hot juice and sealing, is rolled along guide rails 24 one or both of which may be heated by suitable means such as steam pipes 23 which may be provided with suitable heat insulation 25. Where heating means are provided for both rails, controls may be provided so that heat may be applied to either one or both of them. The cans are rolled along the rails 24 by means of an endless conveyor belt 26 trained about pulleys 27 one of which is driven by any conventional means, not shown. The lower run of this belt rests, by its own weight, on the cans and rolls them along the rails. By this arrangement the double seams at one or both ends of the can may be rapidly heated and sterilized without appreciably increasing the temperatures of the contents. As in the Figure 1 modification, the cans are fed directly to cooling means, thus materially reducing the time of holding the juice at an elevated temperature.

It is optional whether one or both ends of the can are applied to the hot plate. In practice those microorganisms which are harmful to citrus juices are not usually present in the can factory. There is, accordingly, little chance of contamination of the double seam on the bottom end of the can, which is formed at the can factory. There is, therefore, less need for heating this bottom seam except where it is desired to be absolutely certain as to sterility. However, these harmful microorganisms are present in the cannery in substantial quantities, making the effective sterilization of the double seam on the upper or lid end of the container a necessity. The tacky nature of the sealing compound also contributes to the likelihood of contamination. Mold spores or bacteria tend to adhere to the compound and become imbedded therein in such a way that they are surrounded by a poor heat conductor and not easily destroyed unless adequate heat is applied.

In order to take full advantage of my novel process, all operations are performed quickly so that the juice or other food product is held at an elevated temperature for a minimum length of time. In canning citrus juices, for example, the juice is rapidly heated or flashed to a temperature that will provide adequate sterility in a relatively short period of time and immediately delivered to the canning apparatus which quickly fills the cans and applies the lid thereto. The filled cans are delivered directly from the lidding apparatus to the inverter and seam sterilizer and then to the cooling apparatus. Under ideal conditions the over-all time during which the juice is subjected to elevated temperatures is in the order of one minute. The time factor is generally dependent on the type and speed of the apparatus available and while it is possible, with the most suitable apparatus, to reduce this time to about one minute, with slower apparatus the time required would vary from about 1 to 5 minutes.

By following my novel method the time and/or temperature necessary for adequate heat treatment of the citrus juice or other foods is reduced to a minimum. Accordingly, the flavor and food value of juices or other foods canned by this method will more nearly approach their natural values than has been heretofore possible when conventional methods are employed.

Having described my invention, what I claim is:

1. In a method of canning food in a sanitary type can, the steps of sterilizing the food by heating rapidly, immediately placing the hot food in the can and sealing a lid thereon by means of a seam, sterilizing the interior of the can by manipulating it to assure contact of the hot food with all parts of the interior, sterilizing the seam by placing it in contact with a surface having a temperature greater than that of the can contents to rapidly increase the seam temperature without materially increasing the temperature of the food or other portions of the can, and immediately thereafter rapidly cooling the can and its contents.

2. In a method of canning citrus juice in a sanitary type can, the steps of sterilizing the juice by heating, placing the hot juice in the can, sealing a lid on the can by means of a seam, inverting the can to assure contact of the hot juice with all portions of the interior thereof to effect sterilization of said portions, quickly heating the seam through contact with a heated surface, while the can is in inverted position, to a temperature sufficient to sterilize the seam without materially increasing the temperature of other portions of the can or its contents, and immediately thereafter cooling the can and the juice contained therein.

3. In a method of canning citrus juice in a sanitary type can, the steps of sterilizing the juice by heating rapidly, immediately placing the hot juice in the can and sealing a lid thereon by means of a double seam, sterilizing the can interior by heating through contact with the hot juice, inverting the can to assure contact of the juice with all portions of its interior, sterilizing the seam by heating rapidly through contact with a heated surface, while the can is inverted, without materially increasing the temperature of other portions of the can or its contents, and immediately thereafter rapidly cooling the can and its contents.

4. In a method of canning citrus juice in a sanitary type can, the steps of sterilizing the juice by heating rapidly, immediately placing the hot juice in the can and sealing a lid thereon by means of a seam, sterilizing the can interior by heating through contact with the hot juice, sterilizing the seam by heating through contact with a heated surface without materially increasing the temperature of the juice or other portions of the can, and immediately thereafter rapidly cooling the can and its contents.

5. In a method of canning citrus juice in a sanitary type can, the steps of substantially filling the can with pasteurized juice at a temperature high enough to sterilize the can on contact therewith, seaming a lid to the can, inverting the can, selectively heating the lid seam without materially heating other portions of the can or contents, and immediately thereafter cooling the can and its contents.

6. A method according to claim 5 in which the total elapsed time from the heating of the juice to the cooling thereof is in the order of one minute.

7. A method according to claim 5 in which the total elapsed time from the heating of the juice to the cooling thereof is in the order of from one to five minutes.

8. In a method of canning citrus juice in a sanitary type can, the steps of substantially filling the can with pasteurized juice at a temperature high enough to sterilize the can on contact therewith, seaming a lid to the can, rolling the can about its longitudinal axis, selectively heating the lid seam and the bottom seam, while the can is rolling, without materially heating other portions of the can or contents, and immediately thereafter cooling the can and its contents.

9. A method according to claim 8 in which the total elapsed time from the heating of the juice to the cooling thereof is in the order of one minute.

10. A method according to claim 8 in which the total elapsed time from the heating of the juice to the cooling thereof is in the order of from one to five minutes.

11. In a method of canning citrus juice in a sanitary type can, the steps of substantially filling the can with pasteurized juice at a temperature high enough to sterilize the can on contact therewith, seaming a lid to the can, rolling the can about its longitudinal axis, selectively heating the lid seam, while the can is rolling, without materially heating other portions of the can or contents, and immediately thereafter cooling the can and its contents.

12. A method according to claim 11 in which the total elapsed time from the heating of the juice to the cooling thereof is in the order of one minute.

13. A method according to claim 11 in which the total elapsed time from the heating of the juice to the cooling thereof is in the order of from one to five minutes.

References Cited in the file of this patent

UNITED STATES PATENTS

| | | |
|---|---|---|
| 1,961,681 | Bohart | June 5, 1934 |
| 2,182,383 | Lang et al. | Dec. 5, 1939 |
| 2,298,693 | Griffin et al. | Oct. 13, 1942 |
| 2,332,099 | McKinnis | Oct. 19, 1943 |